(12) United States Patent
Cummings et al.

(10) Patent No.: US 7,894,076 B2
(45) Date of Patent: Feb. 22, 2011

(54) ELECTRO-OPTICAL MEASUREMENT OF HYSTERESIS IN INTERFEROMETRIC MODULATORS

(75) Inventors: William J Cummings, Millbrae, CA (US); Brian Gally, Los Gatos, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 12/031,602

(22) Filed: Feb. 14, 2008

(65) Prior Publication Data

US 2008/0180680 A1   Jul. 31, 2008

Related U.S. Application Data

(62) Division of application No. 11/073,295, filed on Mar. 4, 2005, now Pat. No. 7,359,066.

(60) Provisional application No. 60/613,537, filed on Sep. 27, 2004.

(51) Int. Cl.
   *G01B 9/02* (2006.01)
(52) U.S. Cl. .................................... 356/512; 356/519
(58) Field of Classification Search ................. 356/519, 356/512
   See application file for complete search history.

(56) References Cited

U.S. PATENT DOCUMENTS

| | | | |
|---|---|---|---|
| 3,915,573 A | 10/1975 | Knoll et al. | |
| 5,175,772 A | 12/1992 | Kahn et al. | |
| 5,559,358 A | 9/1996 | Burns et al. | |
| 5,920,632 A | 7/1999 | Lubbe et al. | |
| 5,986,796 A | 11/1999 | Miles | |
| 6,034,480 A | 3/2000 | Browning et al. | |
| 6,040,937 A | 3/2000 | Miles | |
| 6,091,887 A | 7/2000 | Dieterle et al. | |
| RE37,847 E | 9/2002 | Henley et al. | |
| 6,567,715 B1 | 5/2003 | Sinclair et al. | |
| 6,674,090 B1 | 1/2004 | Chua et al. | |
| 6,674,562 B1 | 1/2004 | Miles | |
| 6,777,249 B2 | 8/2004 | Yamazaki | |
| 6,950,193 B1 | 9/2005 | Discenzo | |
| 7,026,821 B2 | 4/2006 | Martin | |
| 7,123,216 B1 | 10/2006 | Miles | |
| 7,126,741 B2 | 10/2006 | Wagner et al. | |
| 7,187,489 B2 | 3/2007 | Miles | |
| 7,359,066 B2 | 4/2008 | Cummings et al. | |

(Continued)

FOREIGN PATENT DOCUMENTS

WO   WO 95/30924   11/1995

(Continued)

OTHER PUBLICATIONS

Office Action dated Jul. 4, 2008 in Chinese App. No. 200510102600.X.

(Continued)

*Primary Examiner*—Hwa S. A Lee
(74) *Attorney, Agent, or Firm*—Knobbe Martens Olson & Bear LLP

(57) ABSTRACT

Disclosed herein are methods and apparatus for testing interferometric modulators. The interferometric modulators may be tested by applying a time-varying voltage stimulus and measuring the resulting reflectivity from the modulators.

22 Claims, 12 Drawing Sheets

U.S. PATENT DOCUMENTS

| | | |
|---|---|---|
| 2002/0157033 A1 | 10/2002 | Cox |
| 2004/0081438 A1 | 4/2004 | Hahn et al. |
| 2007/0097134 A1 | 5/2007 | Miles |
| 2008/0088638 A9 | 4/2008 | Miles |

FOREIGN PATENT DOCUMENTS

| | | | |
|---|---|---|---|
| WO | WO 99/52006 | * | 10/1999 |

OTHER PUBLICATIONS

Notice of Reasons for Rejection dated Sep. 24, 2008, in Japanese App. No. 2005-219836.

Office Action received May 8, 2009 in Chinese App. No. 200510102600.X.

Final Notice of Rejection dated Jun. 2, 2009, in Japanese App. No. 2005-219836.

Decision of Rejection dated Oct. 23, 2009 in Chinese App. No. 200510102600.X.

Decision of Dismissal of Amendment dated Apr. 20, 2010 in Japanese App. No. 2005-219836.

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani et al., "Surface Micromachined Tuneable Interferometer Array," Sensors and Actuators, pp. 17-23 (1994).

Conner, "Hybrid Color Display Using Optical Interference Filter Array," SID Digest, pp. 577-580 (1993).

Durr et al., "Reliability Test and Failure Analysis of Optical Mems" Proceedings of the 9th International Symposium on the Physical and Failure Analysis of Integrated Circuits, pp. 201-206, (Jul. 8-12, 2002).

Miles, A New Reflective FPD Technology Using Interferometric Modulation, Journal of the SID, 5/4, 1997, pp. 379-382.

Miles, "Interferometric Modulation:MOEMS as an Enabling Technology for High-Perfomorance Reflective Displays," Proceedings of the SPIE, vol. 4985, p. 131-139. (2003).

Miles et al., "Digital Paper™ for Reflective Displays," J. of the Society for Information Display Soc. Inf. Display USA. vol. 11, No. 1, p. 209-215. (2003).

Raley et al., "A Fabry-Perot Microinterferometer for Visible Wavelengths," IEEE Solid-State Sensor and Actuator Workshop, Hilton Head, SC (1992).

Skaggs et al, "Automatic Testing of the Digital Micromirror Device", IEEE/LEOS 1996 Summer Topical Meetings, pp. 11-12, (Aug. 5-9, 1996).

Srikar et al., "A Critical Review of Microscale Mechanical Testing Methods Used in the Design of Microelectromechanical Systems," Society for Experimental mechanics, vol. 43, No. 3, (2003).

Austrian Search Report No. 73/2005, mailed on May 19, 2005.

European Search Report for Application No. 05255662.8-2217, dated Dec. 30, 2005.

Office Action dated Jan. 9, 2007 in U.S. Appl. No. 11/073,295.

Office Action dated Aug. 28, 2007 in U.S. Appl. No. 11/073,295.

* cited by examiner

ELECTRO-OPTICAL MEASUREMENT OF HYSTERESIS IN INTERFEROMETRIC MODULATORS

RELATED APPLICATION

This application is a divisional of U.S. application Ser. No. 11/073,295 entitled "ELECTRO-OPTICAL MEASUREMENT OF HYSTERESIS IN INTERFEROMETRIC MODULATORS", filed Mar. 4, 2005 which claims priority to U.S. Provisional Application No. 60/613,537, filed on Sep. 27, 2004, all of which are hereby incorporated by reference in their entirety.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial to utilize and/or modify the characteristics of these types of devices so that their features can be exploited in improving existing products and creating new products that have not yet been developed. In order to ensure high quality, accurate and convenient methods for testing the operation of such MEMS devices may be employed in the manufacturing process. Further development of such methods is needed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

One embodiment comprises a method of testing a plurality of interferometric modulators, comprising applying a triangular voltage waveform to the interferometric modulators and detecting reflectivity of light from the interferometric modulators.

Another embodiment comprises a method of determining electrical parameters for driving a plurality of inteferometric modulators, comprising applying a time-varying voltage stimulus to the interferometric modulators, detecting reflectivity of light from the interferometric modulators, and determining one or more electrical parameters from the reflectivity of light in response to the time-varying voltage stimulus, the electrical parameters indicative of electrical parameters sufficient to cause a change in state of the interferometric modulators.

Another embodiment comprises a method of testing a plurality of interferometric modulator structures, comprising applying a time-varying voltage waveform to the interferometric modulators, detecting reflectivity of light from the interferometric modulators, determining reflectivity of light as a function of voltage, and identifying the plurality of interferometric modulators as of sufficient quality for use in a display based on the determining.

Another embodiment comprises a system for testing a plurality of interferometric modulators, comprising an illumination source adapted to provide incident light to a plurality of interferometric modulators, a voltage source adapted to apply enough voltage to the interferometric modulators so as to change their state, and an optical detector adapted to detect light reflected from the plurality of interferometric modulators.

Another embodiment comprises a method of testing a plurality of inteferometric modulators, comprising applying a time-varying voltage waveform to the interferometric modulators, detecting reflectivity of light from the interferometric modulators, repeating the applying and detecting steps one or more times, averaging at least a portion of the detected reflectivity, and determining one or more electrical parameters from the averaged reflectivity.

Another embodiment comprises a method of testing a color interferometric modulator display, the display comprising a plurality of sub-pixel types, each sub-pixel type corresponding to a different color, the method comprising applying a time-varying voltage waveform to one sub-pixel type, detecting reflectivity of light from the sub-pixel type, determining one or more electrical parameters from the detecting, and repeating the applying, detecting, and determining steps for another sub-pixel type.

Another embodiment comprises a method of testing a plurality of interferometric modulators, comprising a means for applying a time-varying voltage waveform to the interferometric modulators, a means for detecting reflectivity of light from the interferometric modulators, and a means for determining one or more parameters based on the detected reflectivity.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As described in more detail below, interferometric modulators exhibit a hysteresis characteristic that affects the way that the interferometric modulators can be driven. Thus, one test of whether manufactured interferometric modulators are appropriate for use in a display is to determine whether a desired hysteresis characteristic is observed. Furthermore, measurement of the hystersis characteristics of interferometric modulators can provide the appropriate electrical parameters for use in driving the interferometric modulators. Accordingly, described below are methods and devices for testing the hysteresis characteristics of interferometric modulators by applying a time-varying voltage stimulus to the modulators and detecting the response of reflectance from the modulators.

As will be apparent from the following description, embodiments may be provided in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
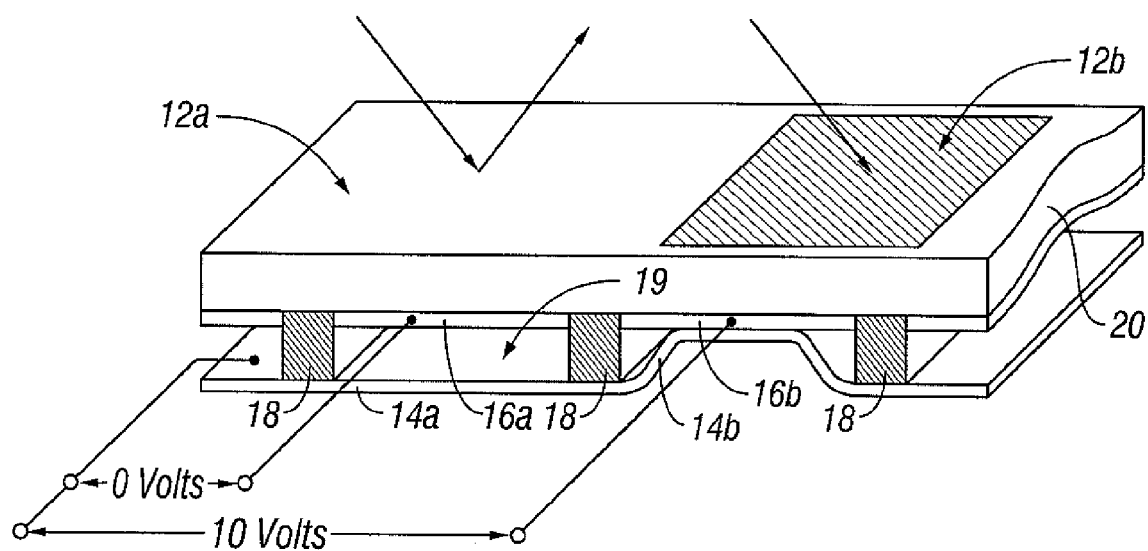
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12*b* on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
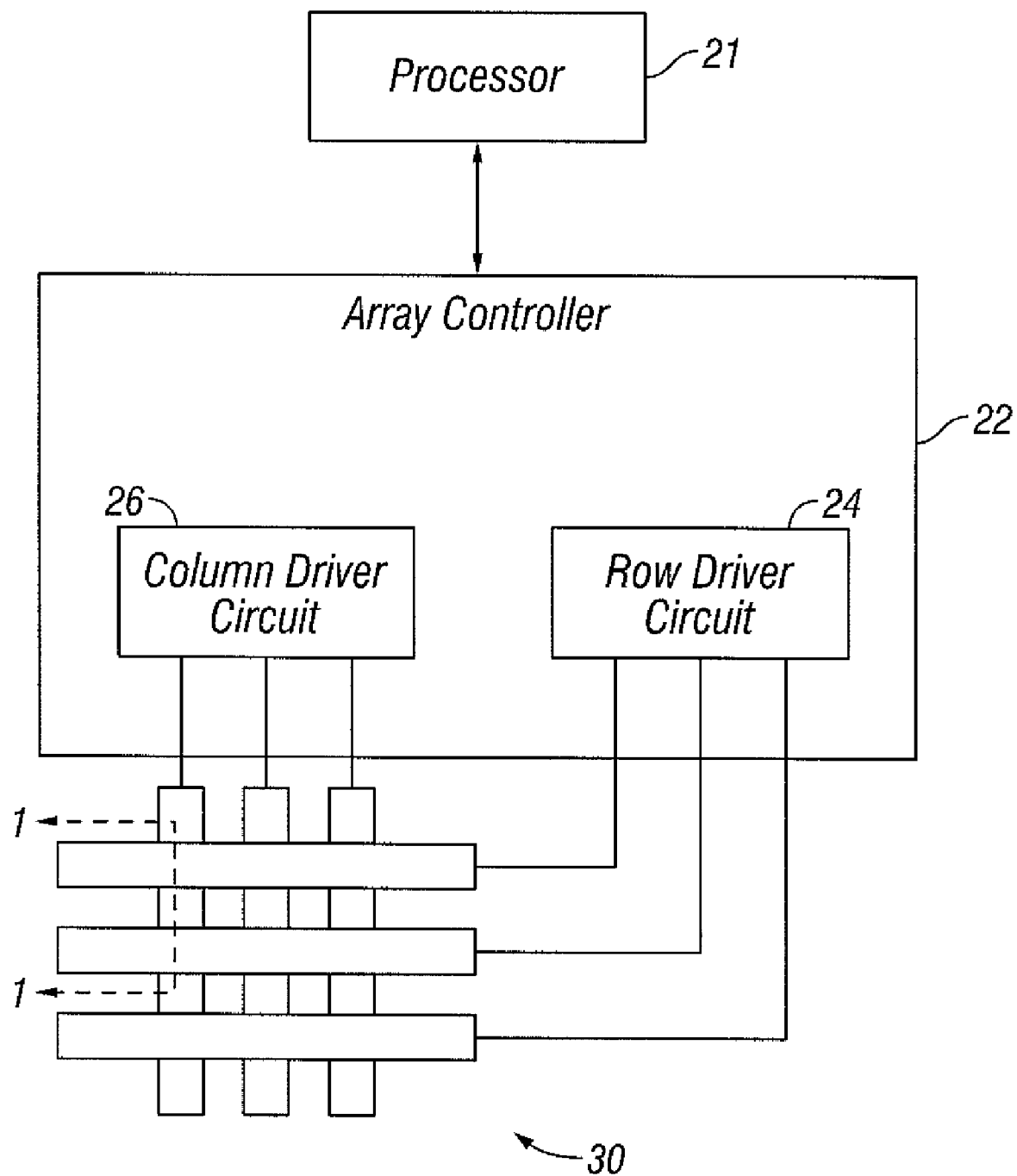
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of a display application. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. The potential difference required to cause actuation of an interferometric modulator may be referred to as the "actuation potential." When the voltage is reduced from that value, the movable layer maintains its state as the voltage drops back below 10 volts. In the exemplary embodiment of FIG. 3, the movable layer does not release completely until the voltage drops below 2 volts. The potential difference at which and actuated interferometric modulator releases may be known as the "release potential." There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with interferometric modulator displays.

Figures 3, 4:
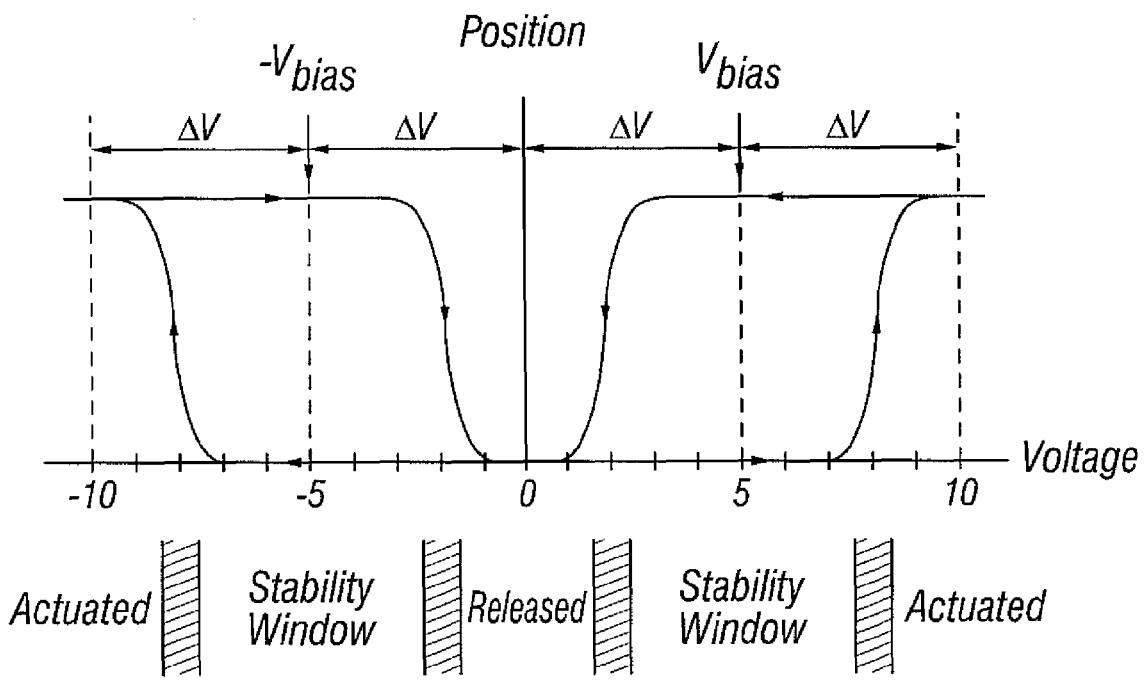
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
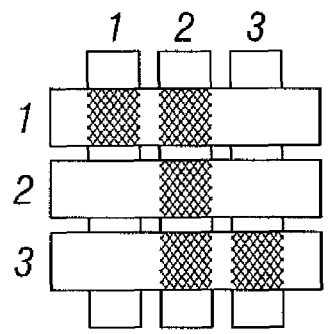
FIGS. 5A and 5B illustrate one exemplary timing diagram for row and column signals that may be used to write a frame of display data to the 3×3 interferometric modulator display of FIG. 2.
Figure 5B:
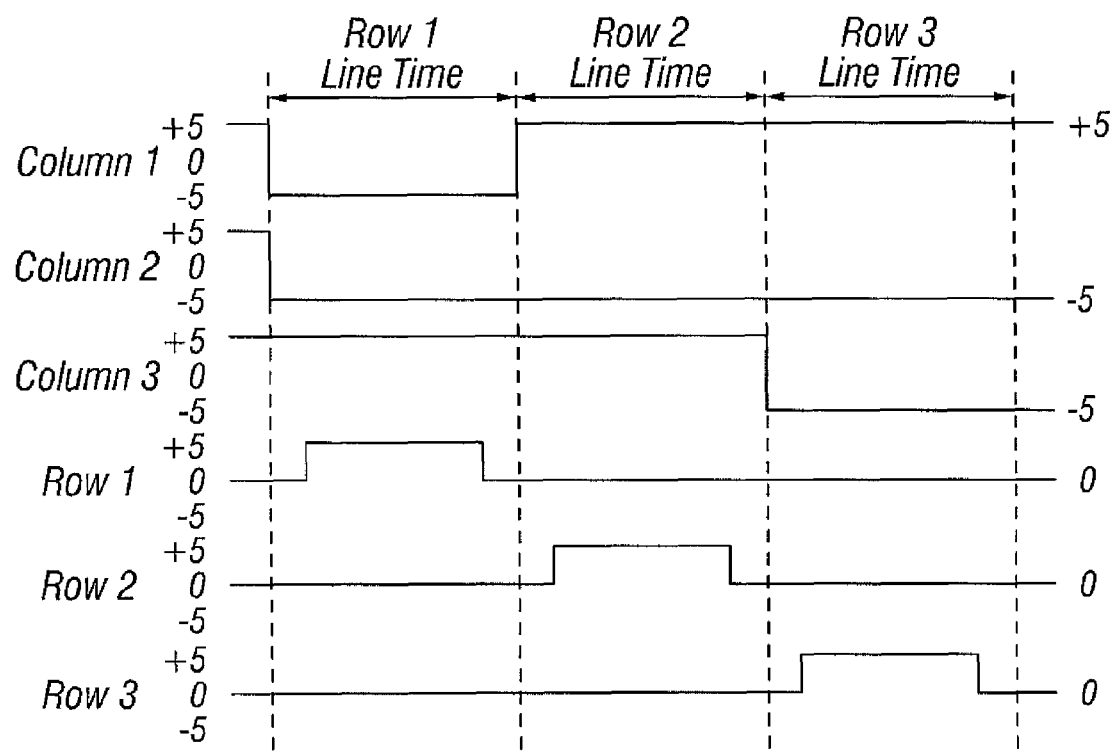

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with interferometric modulator displays.

Figure 6A:
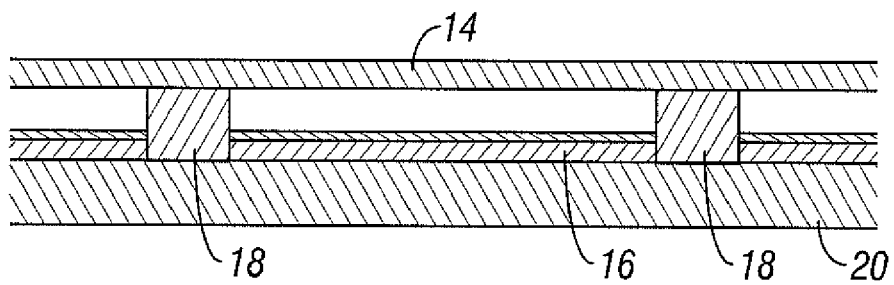
FIG. 6A is a cross section of the device of FIG. 1.
Figure 6B:
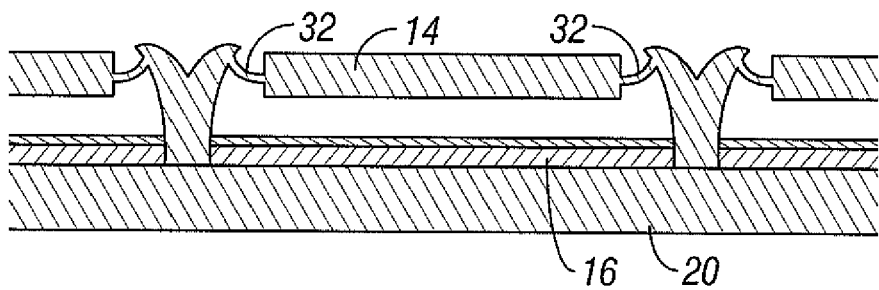
FIG. 6B is a cross section of an alternative embodiment of an interferometric modulator.
Figure 6C:
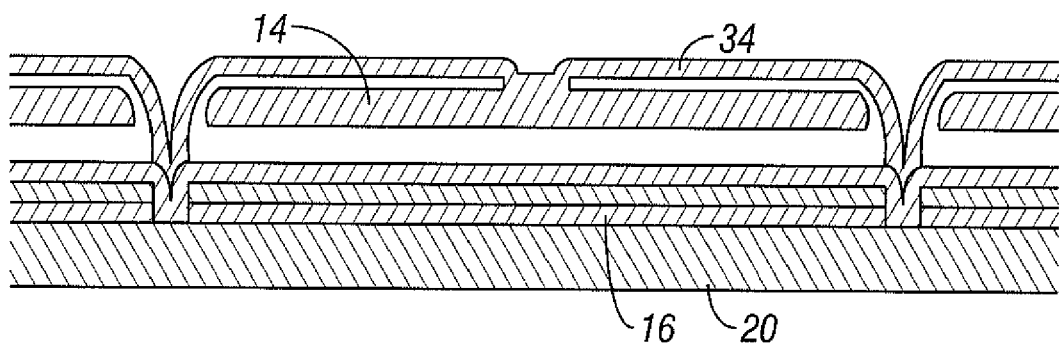
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

As described above, the hysteresis characteristics of interferometric modulators affect the way that the interferometric modulators can be driven and provide a stability or "memory" voltage window in which interferometric modulators can maintain their state with little power consumption. Thus, one test of whether manufactured interferometric modulators are appropriate for use in a display is to determine whether a desired hysteresis characteristic is observed. Furthermore, measuring of the hystersis characteristics of interferometric modulators can provide the appropriate electrical parameters for use in driving the interferometric modulators. For example, the appropriate bias potential, $V_{bias}$ (also referred to herein as "$V_b$"), for use in driving interferometric modulators as described above can be determined by measuring hysteresis characteristics. In addition, once the hysteresis characteristics of an interferometric modulator array is known, suitable driving schemes other than that described above can be formulated. Accordingly, described below are methods and devices for testing the hysteresis characteristics of interferometric modulators.

In one embodiment, the hysteresis characteristics may be determined by measuring the reflectance from one or more interferometric modulators in response to a time-varying voltage stimulus applied to the interferometric modulators. The voltage stimulus may be such that the interferometric modulators are varied between an actuated and a non-actuated state. The detection of reflectance from the interferometric modulators will thus provide an indication of what state the interferometric modulators are in because the reflectance from interferometric modulators are different between actuated and non-actuated states. In one embodiment, in an actuated state, the reflectance will be low and in a non-actuated state, the reflectance will be high.

In one embodiment, the time-varying voltage stimulus is a triangular voltage waveform. The amplitude of the triangular voltage waveform may advantageously be chosen so that it exceeds the voltage necessary to induce actuation of an interferometric modulator. In one embodiment, the amplitude of the waveform is between about 1.0 to about 2.0 times the voltage necessary to induce interferometric modulator actuation. In one embodiment, the amplitude of the waveform is about 1.25 times the voltage necessary to induce interferometric modulator actuation. In one embodiment, the frequency of the voltage waveform is slow enough so that the interferometric modulator response approximates a DC voltage response. In one embodiment, the frequency is less than about 20 Hz. In one embodiment, the frequency is between about 1 Hz and about 15 Hz. In one embodiment, the frequency is about 2.5 Hz. Those of skill in the art will appreciate that time-varying voltage waveforms other than triangular may be applied to determine the hysteresis characteristics of interferometric modulators.

Figure 7:
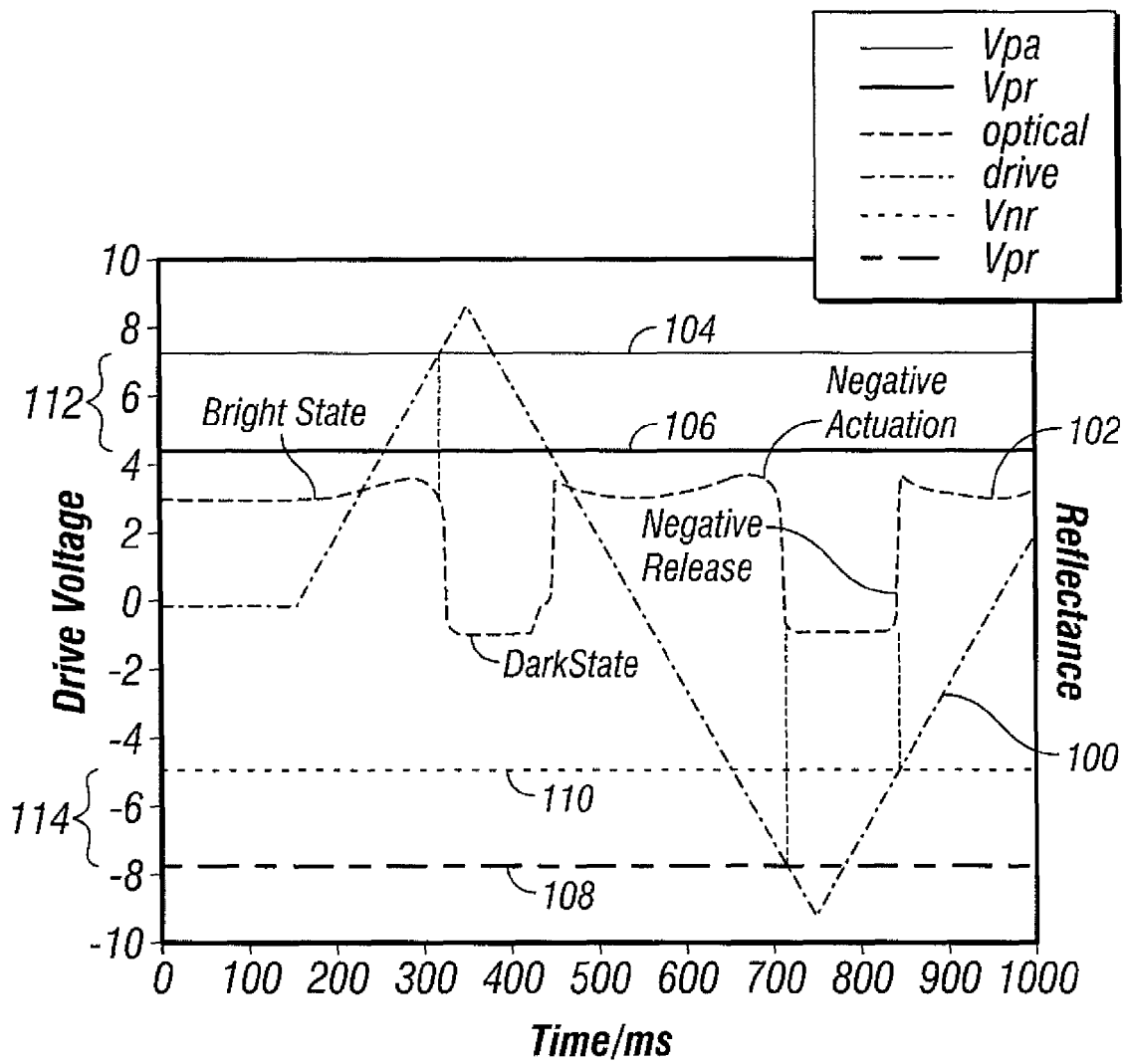
FIG. 7 is a plot of applied voltage and reflectivity response as a function of time when a triangular voltage waveform is applied to an interferometric modulator.

One example of an applied triangular voltage waveform and reflectance response is depicted in FIG. 7. FIG. 7 shows a plot 100 of a triangular voltage waveform applied to an interferometric modulator and a plot 102 of the resulting reflectance from the interferometric modulator as a function of time. Prior to application of the triangular voltage waveform (e.g., from 0 to 150 ms in FIG. 7), the voltage is approximately 0 and the reflectance from the interferometric modulator is high. The high reflectance is due to the interferometric modulator being in an unactuated state. Upon commencement of applying the triangular voltage waveform, the voltage is ramped in a positive direction (e.g., starting at 150 ms in FIG. 7). Initially, the reflectance remains high and relatively constant as the voltage is ramped. Upon reaching a high enough voltage (e.g., approximately 7.3 V in FIG. 7), the reflectance level suddenly drops due to the interferometric modulator switching to an actuated state. The voltage at which this transition occurs may be referred to as the positive actuation potential ($V_{pa}$) 104. As the voltage is increased further, no change in reflectance is observed.

Next, the voltage is ramped in a negative direction (e.g., starting at 350 ms in FIG. 7). The reflectance remains low and relatively constant until the voltage is low enough, when the reflectance will suddenly jump back to a high level (e.g., at approximately 4.3 V in FIG. 7) due to the interferometric modulator switching back to a non-actuated state. The voltage at which this transition occurs may be referred to as the positive release potential ($V_{pr}$) 106. The voltage may be decreased further into negative values with little change in reflectance. When the voltage reaches a negative enough value, another sudden decrease in reflectance is observed (e.g., at approximately −7.8 V in FIG. 7) due to the interferometric modulator re-actuating. The voltage at which this transition occurs may be referred to as the negative actuation potential ($V_{na}$) 108. As the voltage is decreased further, no change in reflectance is observed.

Finally, the voltage is again ramped in a positive direction (e.g., starting at 750 ms in FIG. 7). No significant change in reflectance is observed until the voltage increases to a sufficient level (e.g., at approximately −5 V in FIG. 7) at which point the reflectance suddenly increases due to transition of the interferometric modulator to a non-actuated state. The voltage at which this transition occurs may be referred to as the negative release potential ($V_{nr}$) 110. FIG. 7 demonstrates that two memory windows 112 and 114 exist. Voltages applied within the windows 112 and 114 will not cause a change in interferometric modulator state.

The four parameters that characterize an interferometric modulator's hysteresis characteristic, $V_{pa}$, $V_{pr}$, $V_{na}$, and $V_{nr}$, may be used to determine the electrical parameters necessary to drive the interferometric modulator. For example, it is desirable that pulses to actuate the interferometric modulator be such that a voltage in excess of $V_{pa}$ or below $V_{na}$ is applied. Similarly, to release an interferometric modulator, it is desirable that pulses with voltages between $V_{pr}$ and $V_{nr}$ be applied. At all other times, it is desirable that the applied drive voltage be within the two memory windows so that the interferometric modulator does not change state.

As an alternative to the four parameters discussed above, an interferometric modulator's hystersis characteristic may be defined by a bias potential ($V_b$), an offset potential ($V_{off}$), and a single memory window ($\Delta V_{mem}$). While the hysteresis characteristic of an interferometric modulator is substantially symmetric between positive and negative potentials, the symmetry is usually not perfect. For example, in FIG. 7, $V_{pa}$ is approximately 7.3 V while $V_{na}$ is approximately –7.8 V. This discrepancy may be characterized by an offset potential ($V_{off}$). While not being bound by any particular theory, the offset potential may be due to embedded charge created during some of the film deposition steps during interferometric modulator manufacture. The offset potential may be simply defined as the average of $V_{pa}$ and $V_{na}$ (e.g., approximately –0.25 V in FIG. 7):

$$V_{off}=(V_{pa}+V_{na})/2$$

Alternatively, the offset potential may be defined as the average of the centers of the memory windows:

$$V_{off}=[((V_{pa}+V_{pr})/2)+((V_{na}+V_{nr})/2)]/2$$

Those of skill in the art will appreciate other ways of expressing the concept of offset potential. Although there are two memory windows in the hysteresis characteristic, for the purposes of driving an interferometric modulator, a single parameter, $\Delta V_{mem}$, may be defined. Advantageously, $\Delta V_{mem}$ may be defined so that voltages falling within $\Delta V_{mem}$ will be within either of the two memory windows. Thus, for example, the smallest of the two memory windows may be used for $\Delta V_{mem}$:

$$\Delta V_{mem}=\mathrm{Min}[(V_{pa}-V_{pr}),(-(V_{na}-V_{nr})]$$

The bias potential, $V_b$, may be defined as the amplitude of the voltage at the centers of the memory windows. Thus, $V_b$ defines the displacement of the memory windows from 0 V. Because there are two memory windows, a single parameter $V_b$ may be defined as the average of the amplitude of the centers of the two memory windows:

$$V_b=[((V_{pa}+V_{pr})/2)-((V_{na}+V_{nr})/2)]/2$$

Figure 8:
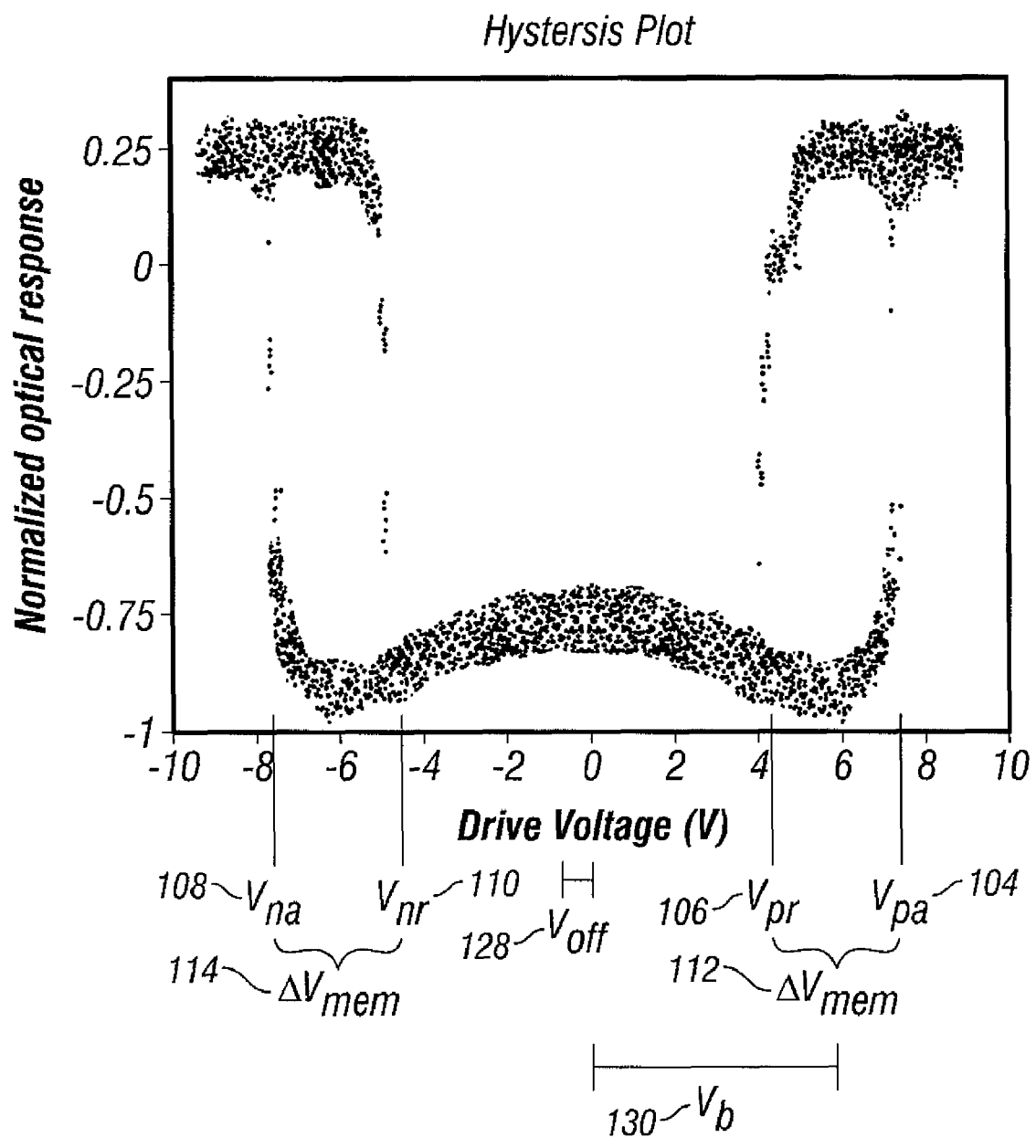
FIG. 8 is a plot of reflectivity from an interferometric modulator as a function of applied voltage.

FIG. 8 depicts another view of the hystersis curve described in FIG. 7. In FIG. 8, reflectivity (normalized optical response) is plotted as a function of drive voltage. All of the parameters described above are depicted in FIG. 8. For example, $V_{pa}$ 104, $V_{pr}$ 106, $V_{na}$ 108, and $V_{nr}$ 110 are indicated on the voltage axis. $\Delta V_{mem}$ is indicated for the positive memory window 112 and negative memory window 114. The offset potential $V_{off}$ is indicated as a small negative offset 128 from 0 V due to asymmetry in the hysteresis curve. Finally, the bias potential $V_b$ is indicated as an offset 130 of the memory window from 0 V. In one embodiment, reflectivity may be normalized by normalizing the average reflectance observed from actuated interferometric modulators to a fixed positive value (e.g., 0.25 in FIG. 8) and the average reflectance observed from undriven interferometric modulators to a fixed negative value (e.g., –0.75 in FIG. 8). The actuation potentials $V_{pa}$ 104, $V_{pr}$ 106, $V_{na}$ 108, and $V_{nr}$ 110 may then be determined as the potentials were the normalized reflectivity is zero.

The parameters described above may be used to determine the appropriate voltage drive characteristics of the interferometric modulator. For example, the offset potential $V_{off}$ may be used to define a DC offset potential to be applied to all drive voltages. The bias potential $V_b$ may be used to define the amplitude of a voltage waveform (e.g., memory waveform) that can be applied to the interferometric modulator without causing the interferometric modulator to change state. One use of the bias potential in driving interferometric modulators is described above with reference to FIG. 4. Those of skill in the art will appreciate other drive schemes making use of the parameters determined by the measurement methods described herein. Testing for this purpose may be conducted shortly after release of an interferometric modulator display or may be conducted periodically during operation of the display to adjust the drive characteristics. For example, an optical detector may be incorporated within the interferometric modulator display to detect light reflected from at least some of the interferometric modulators in the display.

The parameters described above may also be used in testing of interferometric modulators for quality control purposes. For example, thresholds and tolerances may be defined for some or all of the above parameters that determine whether the tested interferometric modulators may be used in a display. Advantageous characteristics of an interferometric modulator for use in a display is that the offset potential be low, the memory window be large enough to prevent accidental actuation or release, and the bias potential be high enough to provide separation between the two memory windows. The precise values and tolerances required will depend on the specific application of the interferometric modulators. In one embodiment, a memory function may be defined as follows:

$$\Delta V_{mem}/(V_{pa}-V_{off})$$

In some display applications, it is desirable that the memory function have a value around 0.2. If the memory function deviates significantly from the desired value, than the tested interferometric modulators will be deemed insufficient for use in a display and thus to have failed the testing. In one advantageous embodiment, an array of interferometric modulators is tested prior to incorporation with drive electronics so that if the array fails testing and is discarded, the costs are reduced.

The parameters described above may also be used to determine physical characteristics of the interferometric modulators. For example, the actuation voltages may be related to the tension and spring constant of the movable mirror. Thus, parameters obtained in testing may provide an indication of what type of failure has occurred if the hysteresis characteristics are not adequate.

Figure 9:
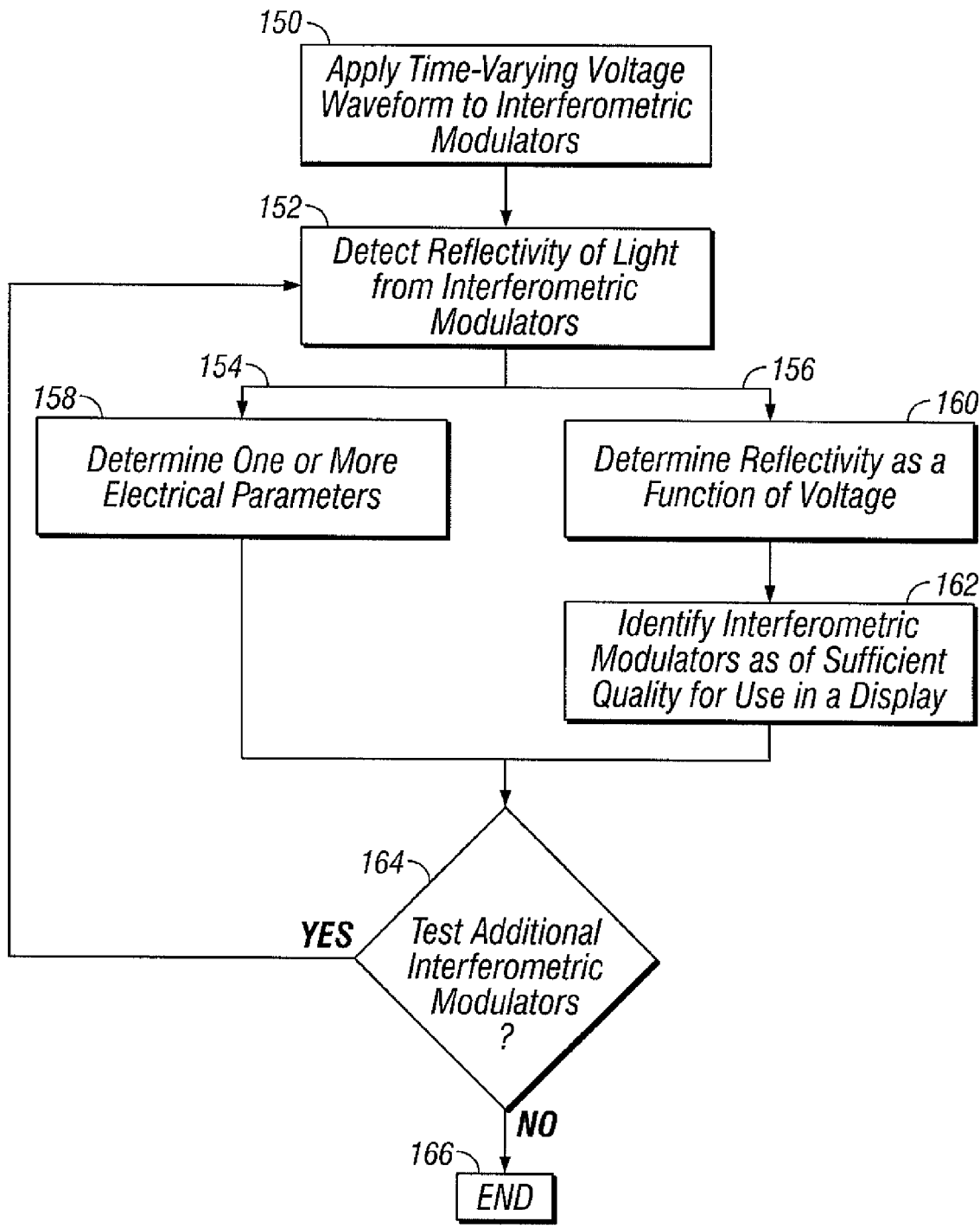
FIG. 9 is a flowchart depicting methods for testing interferometric modulators by applying a time-varying voltage stimulus and measuring reflectivity response.

In some embodiments, methods are provided for testing a plurality of interferometric modulators. FIG. 9 depicts a flowchart of possible method steps. Depending on the particular embodiment, steps may be added to those depicted in FIG. 9 or some steps may be removed. In addition, the order of steps may be rearranged depending on the application. At block 150, a time-varying voltage waveform is applied to the interferometric modulators. As described above, in one embodiment the time-varying voltage waveform is a triangular waveform. The voltage waveform may be simultaneously applied to the plurality of interferometric modulators. In one embodiment, the plurality of interferometric modulators are less than all of the interferometric modulators in a display. In one embodiment, the voltage waveform is applied to all interferometric modulators in a display even though only a subset of interferometric modulators are tested.

Continuing to block 152, the reflectivity of light from the plurality of interferometric modulators is detected. Reflectivity may be detected from all interferometric modulators in a display or from only a subset of interferometric modulators in a display. In some embodiments, a portion of a display is magnified using a microscopic lens for purposes of detecting reflectivity from only that portion of the display. Reflectivity is advantageously measured by exposing the interferometric modulators to a light source and measuring the intensity of reflected light. In some embodiments, intensity of reflected light is measured using a photo detector. In some embodiments, a filter is inserted in front of the photo detector to increase the difference in reflectance observed between the actuated and non-actuated states.

After reflectivity of light has been measured at step 152, the process may proceed differently depending on whether the goal of the testing is to determine drive parameters or to test the display for quality control purposes. If the testing is to determine drive parameters, the process may proceed along branch 154. If the testing is for quality control, the process may proceed along branch 156. On branch 154, one or more electrical parameters are determined at block 158. These parameters may be any of the parameters discussed above or any other parameter suitable for use in determining the appropriate drive characteristics for the interferometric modulators. These parameters may be determined by detecting the voltages where sudden changes in reflectivity from the interferometric modulators occur. These voltages may be used directly or other parameters may be calculated using these voltages as described above. Alternatively, a hysteresis or similar reflectivity-voltage curve may be measured and analyzed by an appropriate algorithm. For example, the curve may be fit to a hysteresis model are the voltages where reflectivity in the curve reaches certain predefined thresholds may be determined.

Referring again to branch 156, reflectivity as a function of voltage is determined at block 160. In some embodiments, step 160 may include determining one or more electrical parameters such as is described above with reference to block 158. The determination made at block 160 may be used to either accept or reject the interferometric modulators for use in a display at block 162. The acceptance or rejection criteria may be based on values and tolerances for specific parameters such as described above or based on the general shape of the reflectance-voltage curve, such as by observing the hysteresis characteristic depicted in FIG. 8.

Both branch 154 and branch 156 next optionally proceed to decision block 164 where it is determined whether additional interferometric modulators are to be tested. The additional interferometric modulators may be modulators on the same array. For example, a different subset of interferometric modulators on a display may be tested. If additional interferometric modulators are to be tested, the process returns to block 152 for detecting reflectivity of light from the additional interferometric modulators. If additional modulators do not need to be tested, the process ends at block 166.

Figure 10:
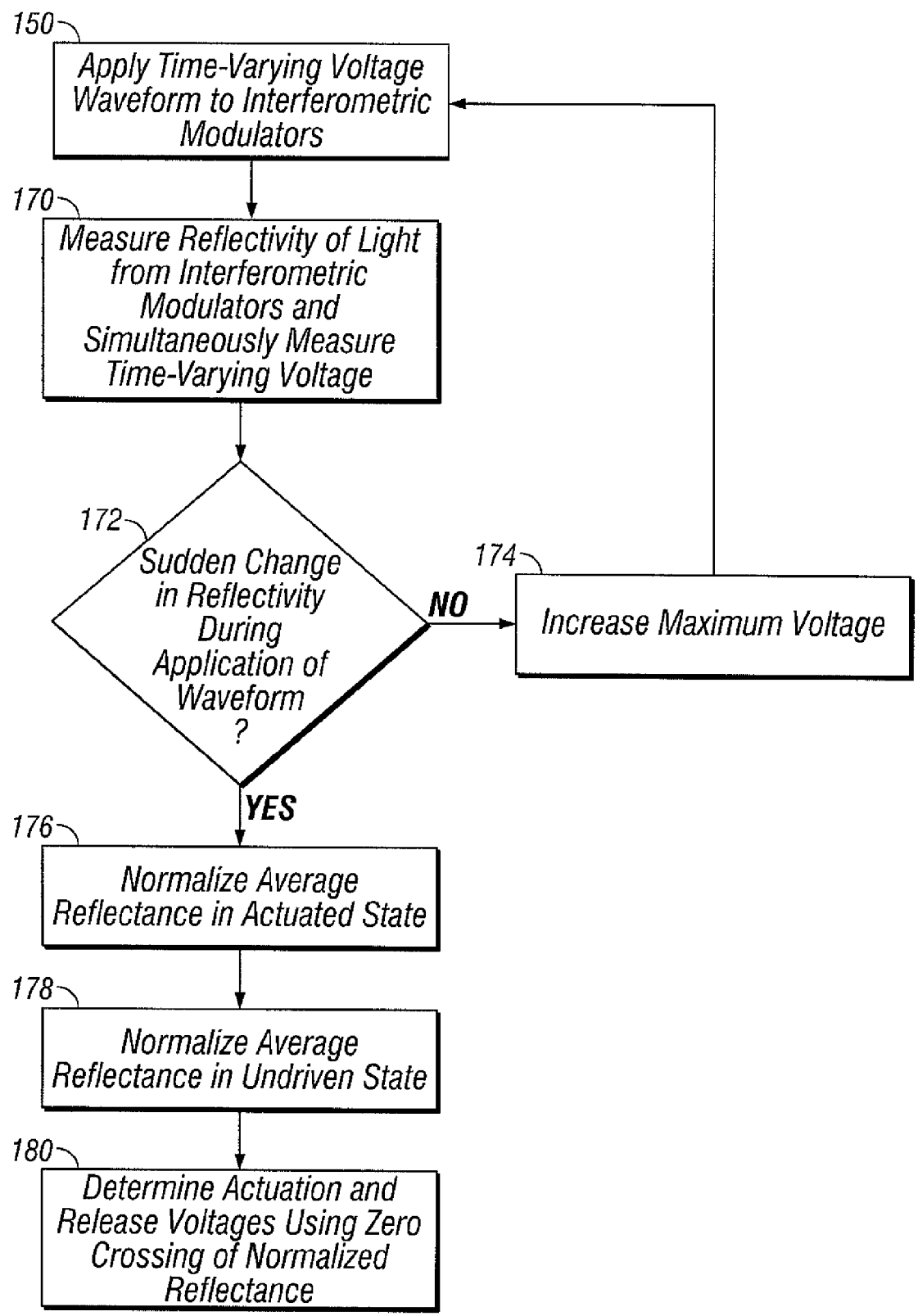
FIG. 10 is a flowchart depicting methods for determining actuation and release voltages in interferometric modulators by normalizing reflectance.

In one embodiment, the sequence depicted in FIG. 9 of steps 150-152-158 or steps 150-152-160 may proceed according to the flow chart depicted in FIG. 10. At block 150 in FIG. 10, a time-varying voltage is applied as described in FIG. 9. At block 170, reflectivity of light from the interferometric modulators is measured and, simultaneously, the voltage applied to the modulators is measured. At decision block 172, it is determined if a sudden change in reflectivity has been observed at any time during the application of the time-varying voltage. The absence of a sudden change in reflectivity may indicate that the applied voltage has not reached high enough levels to induce actuation of the interferometric modulators. Thus, if no sudden change in reflectivity is observed, the process proceeds to block 174 where the maximum voltage of the time-varying voltage is increased and the process starts over at block 150. If a sudden change in reflectivity is observed at decision block 172, the process proceeds to block 176, where the average measured reflectance from interferometric modulators in an actuated state is normalized to a predetermined, positive fixed value. Next the measured reflectance from the interferometric modulators in an undriven (e.g., 0 V) state is normalized to a predetermined, negative fixed value at block 178. Finally, at block 180, actuation and release potentials are determined by determining the potentials where the normalized reflectance crosses zero values. The testing process may then proceed as in FIG. 9 to block 164 or block 162.

In one embodiment, the time-varying voltage stimulus is applied in a periodic fashion. Thus, for example, a series of multiple triangular waveforms may be applied to the interferometric modulators. The series of waveforms may be used to detect a series of hysteresis curves. These hysteresis curves may be used to calculate multiple parameters to which statistics may be applied to determine driving parameters or to make quality control determinations. Alternatively, the multiple hysteresis curves are averaged to increase the signal-to-noise ratio prior to determination of parameters.

In some embodiments, the testing process may be automated. Thus, for example, detection of reflectivity as a function of applied voltage stimulus may be automatically performed at pre-determined areas on an interferometric modulator array. The calculation of parameters and quality control determinations may be automatically performed using suitable algorithms executed on a computing device. Furthermore, positioning of interferometric modulator arrays within a testing apparatus may be automated so that high throughput of mass-manufactured interferometric modulator displays may be accomplished. In some embodiments, a selected percentage sample of mass-manufactured displays are tested for quality control purposes.

Figure 11:
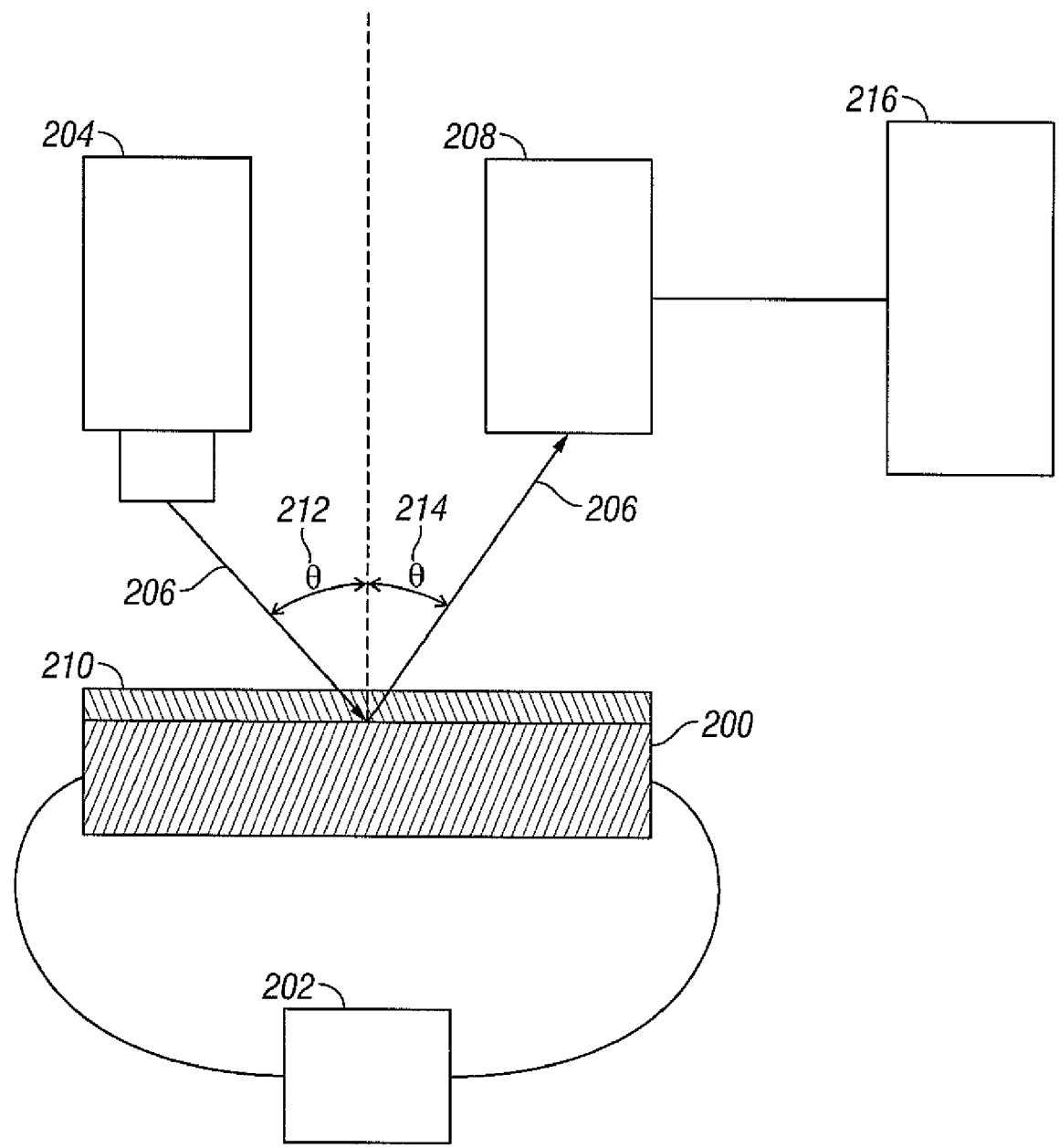
FIG. 11 is an illustration of an apparatus for testing an interferometric modulator by applying a voltage stimulus and measuring reflectivity response.

One embodiment of an apparatus suitable for performing the above described testing is depicted in FIG. 11. The interferometric modulator array 200 is electrically connected to a voltage driving source 202. The voltage driving source 202 applies the time-varying voltage stimulus, such as a triangular voltage waveform, to the array. The voltage signal may be applied to all interferometric modulators in the array simultaneously. Alternatively, a voltage signal may be applied to only those interferometric modulators from which reflectivity are being measured. A light source 204 provides illumination of the interferometric modulators. In one embodiment, a standard D65 light source is used for the light source 204. Light source 204 provides light 206 to the interferometric modulator array 200, which is then reflected upward. A photo detector 208 may be used to detect the intensity of light 206 reflected from the interferometric modulator array 200. A diffuser film 210 may be optionally placed over the interferometric modulator array 200. The diffuser film 210 scatters the light 206 transmitted into and reflected from the interferometric modulator array 200. Such scattering allows the light source 204 and detector 208 to be placed at angles 212 and 214 relative to the array 200. While reflectivity from the array 200 may be at a maximum if angles 212 and 214 are complementary, the use of a diffuser film 210 allows for detection off the specular angle. If a diffuser film 210 is not used then it is advantageous that light 206 enter and reflect back from the array 200 at an angle close to perpendicular to the array 200. Such a configuration is desirable because interferometric modulators typically have a narrow viewing angle causing the intensity of reflected light to fall rapidly at wider angles. A computer 216 running appropriate software may be used to record reflectivity versus voltage characteristics (e.g., the hysteresis curve) and calculate electrical parameters. The computer 216 may also be used to control the automated testing of interferometric modulators.

Figure 12:
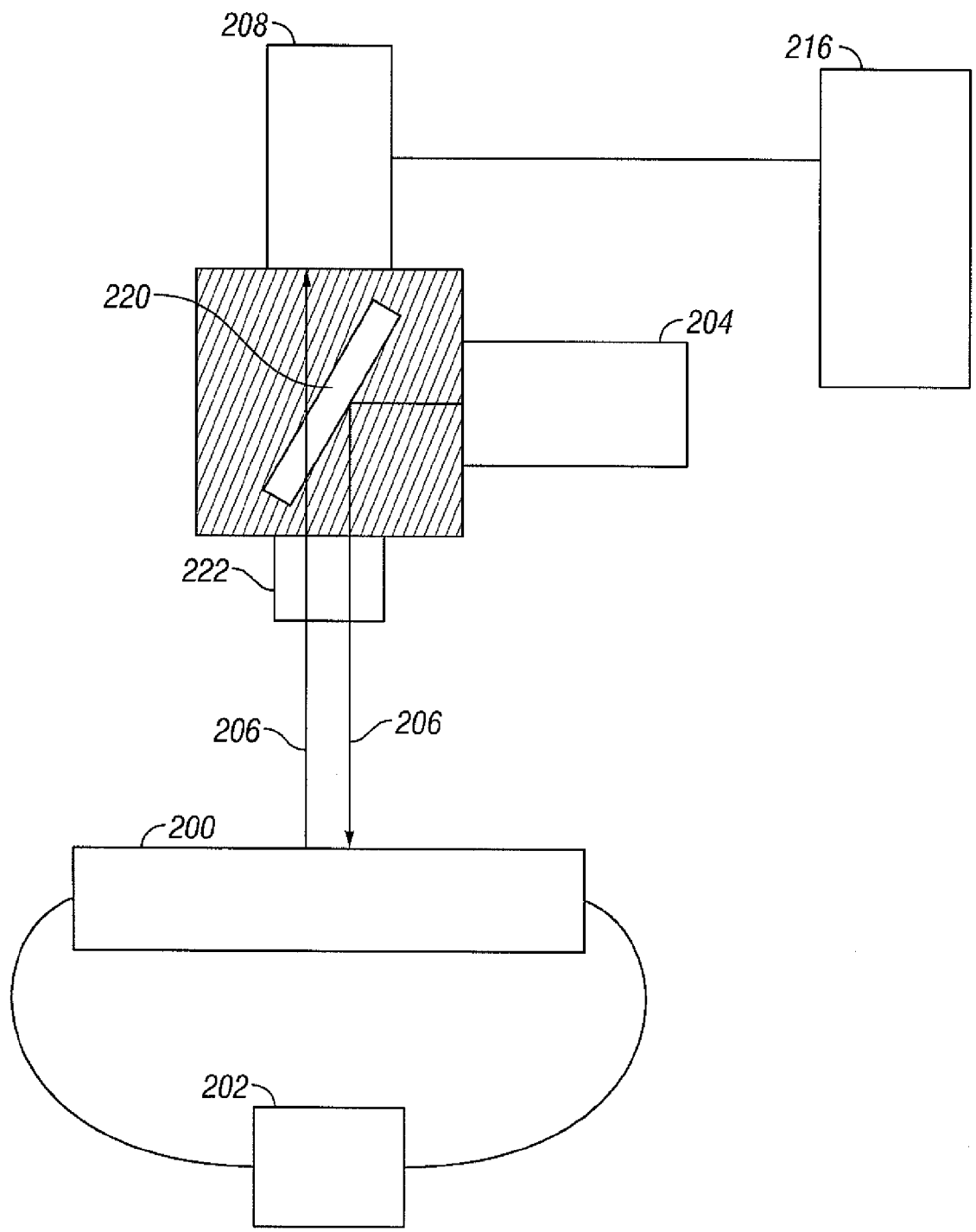
FIG. 12 is an illustration of an apparatus for testing an interferometric modulator by applying a voltage stimulus and measuring reflectivity response using in-line lighting and detection.

FIG. 12 depicts an apparatus that allows in-line lighting and detection for reflectivity measurements of interferometric modulators without use of a diffuser film. In the configuration of FIG. 12, the angles 212 and 214 identified in FIG. 11 are effectively reduced to zero. In FIG. 12, light source 204 provides light 206 to a beam splitter 220. A portion of light 206 is reflected from beam splitter 220 down onto the interferometric modulator array 200, which is being driven by voltage source 202. A portion of the light 206 reflected back from the array 200 passes through beam splitter 220 and into photo detector 208, which may be connected to a computer 216 as described above. Optionally, a microscopic lens 222 may be used to focus the incident light and detection area on a portion of the interferometric modulators in array 200. Those of skill in the art will recognize other means for achieving in-line lighting and detection. For example, a bundle of fiber optics, some of which provide incident light and others which detect reflected light may be aligned over the desired area of array 200.

Figure 13:
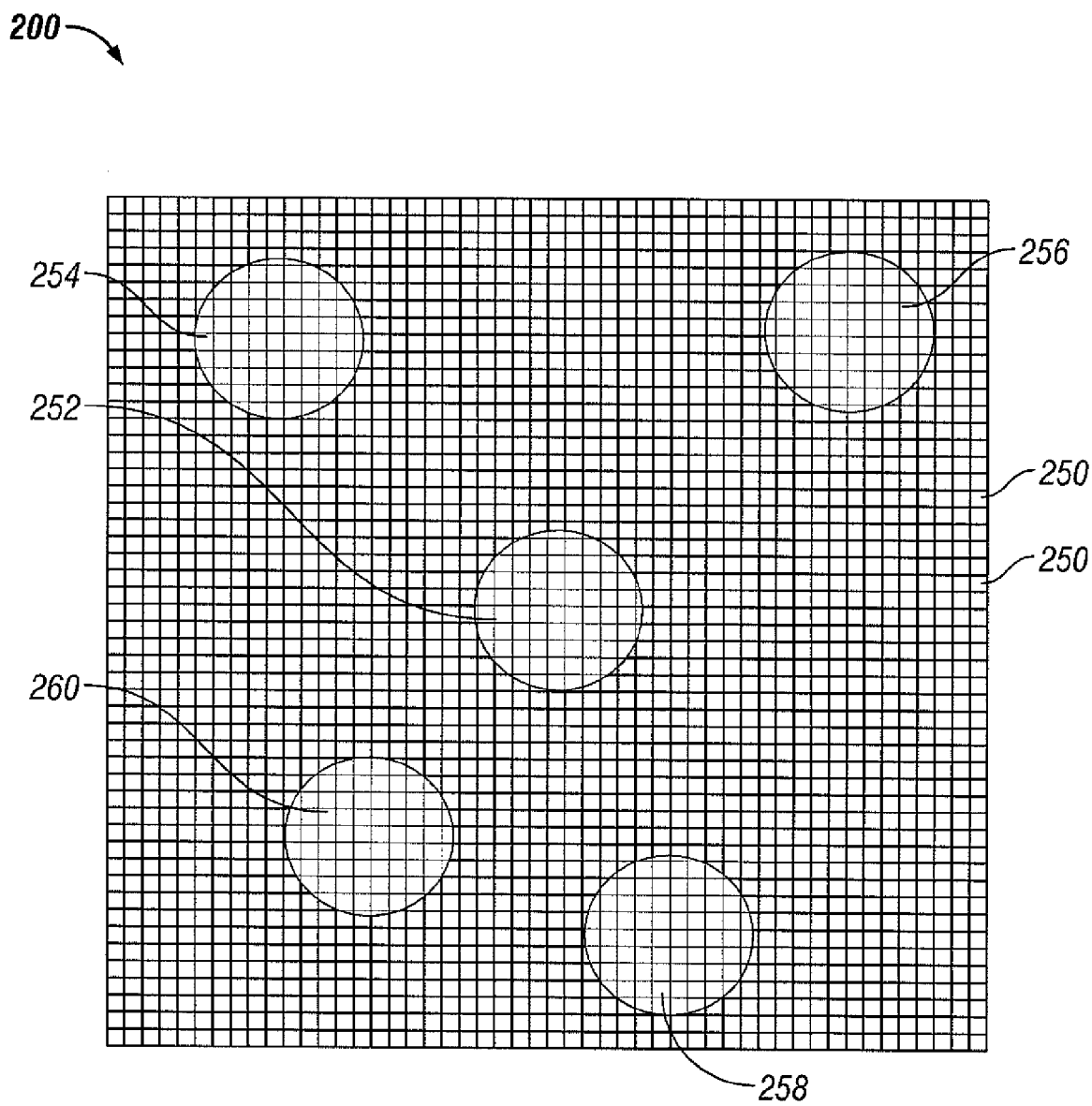
FIG. 13 is an illustration of an interferometric modulator array with test areas identified.

FIG. 13 depicts an interferometric modulator array 200 containing a plurality of interferometric modulator elements 250. As discussed above, a microscopic lens may be used to focus detection of reflectivity on a portion of the interferometric modulator array 200. Thus, for example, area 252 may be the area that is detected during testing. The area 252 tested may be of any suitable size. In one embodiment, only a few interferometric modulator elements 250 are included. In one embodiment, an approximately 1 mm diameter spot is measured. In some embodiments, multiple areas, such as areas 252, 254, 256, 258, and 260 are measured sequentially on the same array 200. The number of areas and location of the areas may be selected based on the desired testing standard. For example, the suggested number of spot measurements and their locations recommended by ANSI or VESA for display testing may be used. In one embodiment, a single area 252 near the center of the array 200 is measured.

In one embodiment, a color interferometric modulator is tested. In this embodiment, it is advantageous to test reflectivity from each color separately. Thus, each set of sub-pixels may be driven separately and reflectivity separately measured. For example, all red sub-pixels in a display may be driven with the time-varying voltage stimulus while the green and blue sub-pixels are driven to an actuated (e.g., dark) state. Thus, reflectivity from only red sub-pixels is measured. The separate hysteresis characteristics of the blue and green sub-pixels may be similarly measured.

Although the foregoing examples have been described in terms of certain embodiments, other embodiments will be apparent to those of ordinary skill in the art. Additionally, other combinations, omissions, substitutions and modification will be apparent to the skilled artisan, in view of the disclosure herein. The scope of the invention is limited only by the following claims.

What is claimed is:

1. A method of determining electrical parameters for driving a plurality of interferometric modulators, comprising:
applying a time-varying voltage stimulus to a plurality of interferometric modulators which are stable in an actuated state and a non-actuated state, wherein the time-varying voltage stimulus includes positive voltages higher than a positive actuation potential of the interferometric modulators and negative voltages lower than a negative actuation potential of the interferometric modulators;
detecting reflectivity of light from the interferometric modulators; and
determining one or more electrical parameters from said reflectivity of light in response to said time-varying voltage stimulus, the electrical parameters comprising an amplitude of an offset voltage in the interferometric modulators.

2. The method of claim 1, wherein determining comprises determining a voltage necessary to cause the interferometric modulators to change from the non-actuated to the actuated state.

3. The method of claim 1, wherein determining comprises determining a voltage necessary to cause the interferometric modulators to change from the actuated state to the non-actuated state.

4. The method of claim 1, wherein determining comprises determining amplitude of a bias voltage in the interferometric modulators.

5. The method of claim 1, wherein determining comprises determining amplitude of a memory window in the interferometric modulators.

6. The method of claim 1, wherein determining comprises:
normalizing the reflectivity to one or more pre-determined values; and
determining potentials where the normalized reflectivity crosses zero.

7. A system for testing a plurality of interferometric modulators, comprising:
an illumination source adapted to provide incident light to a plurality of interferometric modulators;
a voltage source adapted to apply voltages to a plurality of interferometric modulators which are stable in an actuated state and a non-actuated state, the voltages including at least one positive voltage higher than a positive actuation potential of the interferometric modulators and at least one negative voltage lower than a negative actuation potential of the interferometric modulators;
an optical detector adapted to detect light reflected from the plurality of interferometric modulators; and
a computer adapted to determine one or more electrical parameters from said detected light, the electrical parameters comprising an amplitude of an offset voltage in the interferometric modulators.

8. The system of claim 7, wherein the illumination source provides incident light at an angle that is substantially perpendicular to the interferometric modulators.

9. The system of claim 7, wherein the voltage source is simultaneously electrically connected to all interferometric modulators in a reflective display.

10. The system of claim 7, wherein the voltage source is adapted to apply a time-varying voltage waveform.

11. The system of claim 10, wherein the voltage source is adapted to apply a triangular voltage waveform.

12. The system of claim 7, wherein the optical detector is a photo detector.

13. The system of claim 7, wherein the optical detector is adapted to detect light from less than all interferometric modulators in a reflective display.

14. The system of claim 7, wherein the optical detector is adapted to detect light at an angle that is substantially perpendicular to the interferometric modulators.

15. The system of claim 7, wherein the optical detector is adapted to detect light through a diffuser.

16. The system of claim 7, further including a filter disposed in front of the optical detector.

17. A method of testing a plurality of interferometric modulators, comprising:
applying a time-varying voltage waveform to a plurality of interferometric modulators which are stable in an actuated state and a non-actuated state, wherein the time-varying voltage waveform includes positive voltages higher than a positive actuation potential of the interferometric modulators and negative voltages lower than a negative going actuation of the interferometric modulators;

detecting reflectivity of light from the interferometric modulators;

repeating said applying and detecting steps one or more times;

averaging at least a portion of the detected reflectivity; and determining one or more electrical parameters from said averaged reflectivity, the electrical parameters comprising an amplitude of an offset voltage in the interferometric modulators.

18. A method of testing a color interferometric modulator display, the display comprising a plurality of sub-pixel types, each sub-pixel type corresponding to a different color, the method comprising:

applying a time-varying voltage waveform to one sub-pixel type, wherein the time-varying voltage waveform includes positive voltages higher than a positive actuation potential of interferometric modulators in the display which are stable in an actuated state and a non-actuated state and negative voltages lower than a negative actuation potential of the interferometric modulators;

detecting reflectivity of light from said sub-pixel type;

determining one or more electrical parameters from said detecting, the electrical parameters comprising an amplitude of an offset voltage in the interferometric modulators; and repeating said applying, detecting, and determining steps for another sub-pixel type.

19. A system for testing a plurality of interferometric modulators, comprising:

means for applying a time-varying voltage waveform to a plurality of interferometric modulators which are stable in an actuated state and a non-actuated state, wherein the time-varying voltage waveform includes positive voltages higher than a positive actuation potential of the interferometric modulators and negative voltages lower than a negative actuation potential of the interferometric modulators;

means for detecting reflectivity of light from the interferometric modulators; and means for determining one or more electrical parameters based on said detected reflectivity, the electrical parameters comprising an amplitude of an offset voltage in the interferometric modulators.

20. The method of claim 19, wherein the means for applying a time-varying voltage waveform is a voltage source.

21. The method of claim 19, wherein the means for detecting reflectivity is a photo detector.

22. The method of claim 19, wherein the means for determining one or more parameters is a computer.

* * * * *